No. 888,146. PATENTED MAY 19, 1908.
T. DEASY.
DUPLEX TESTING PLUG.
APPLICATION FILED MAY 29, 1907.

WITNESSES:
F. E. Maynard.

INVENTOR:
Thomas Deasy;
BY Geo. H. Strong
ATTORNEY

UNITED STATES PATENT OFFICE.

THOMAS DEASY, OF SAN FRANCISCO, CALIFORNIA.

DUPLEX TESTING-PLUG.

No. 888,146.      Specification of Letters Patent.      Patented May 19, 1908.

Application filed May 29, 1907. Serial No. 376,358.

*To all whom it may concern:*

Be it known that I, THOMAS DEASY, citizen of United States, residing in the city and county of San Francisco and State of California, have invented new and useful Improvements in Duplex Testing-Plugs, of which the following is a specification.

My invention relates to a testing plug for use in testing stack pipes, sewer connections, etc., in buildings and wherever there is need for a testing apparatus. Its object is to provide a simple, practical, adjustable, duplex testing plug, which can be used on or in any kind of connection, either straight or Y, "Durham" or other fittings, and whereby the test can be made as the building goes up story by story, or section by section.

The invention consists of the parts and the construction and combination of parts as hereinafter more fully described and claimed, having reference to the accompanying drawings, in which—

Figure 1:
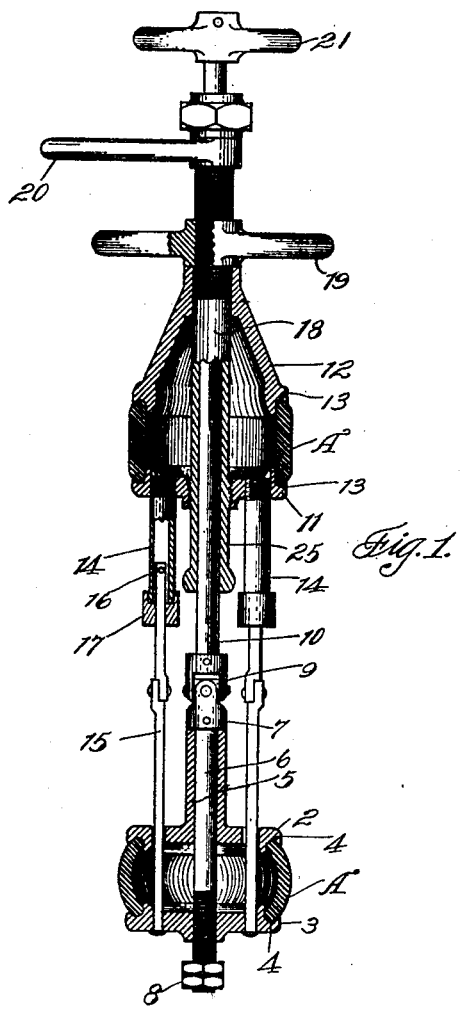
Figure 2:
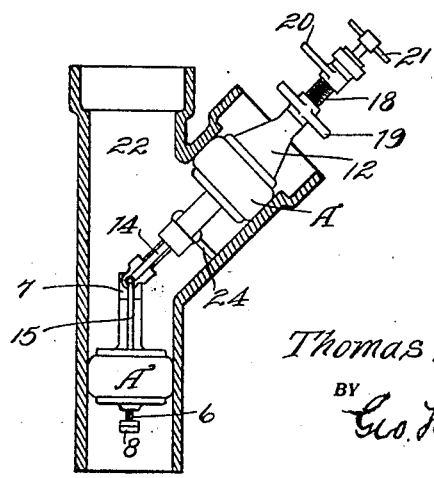

Figure 1 is a central vertical section. Fig. 2 is a diagrammatic view of the device in use.

The invention comprehends two coöperating connected mutually adjustable valve members or plugs which can be independently expanded or contracted from a point exterior to the pipe or fitting into which they are inserted, and irrespective of whether said valve members or plugs are in the same straight line or not.

Each valve member or plug comprises a ring A of rubber or like flexible and suitable material arranged between two clamping plates, which latter by suitable mechanism are adapted to be brought nearer to each other to cause the periphery of the ring to bulge equally at all points and expand the ring to grip the sides of the pipe into which the device is inserted and so form a tight joint; relieving the pressure on the plate allows the bands or rings to straighten out once more and contract to permit the removal of the device from the pipe.

The ring A of the lower plug is clamped between the top and bottom plates 2—3; the two plates have peripheral grooves 4 into which the inwardly beveled edges of the ring A fit. The proper beveling of these grooves and the edges of the ring is important in order to insure the outward bulging of the ring upon the exertion of the compressive force on the plates 2—3. By inwardly beveling the edges of the ring and having the grooves 4 to correspond, the desired result is accomplished. The upper plate 2 has a fixed collar or bearing portion 5 through which a shaft 6 extends. The lower end of the shaft 6 is threaded and engages a corresponding threaded perforation in the lower plate 3. Fixed to the shaft 6 and abutting against the end of the bearing 5 is a fixed collar 7 which acts as a stop to hold plate 2 stationary when the shaft 6 is turned to draw the plate 3 toward the plate 2. In order to prevent the shaft 6 from being unscrewed from the plate 3, a suitable stop as a set-nut or head 8 is provided on the lower outer end of the bolt 6. The upper end of the shaft 6 is connected by a universal joint 9 with a shaft 10 by which the turning of the shaft 6 and the movement of the valve-plate 3 is effected. This universal joint 9 is here shown as comprising a block to which the adjacent ends of the shaft sections 10 and 6 are pivoted each to turn in a plane at right angles to the other.

The upper or outer plug of the device has its expansible ring clamped between a lower plate 11 and a conical member 12; the plate 11 and cone 12 having peripheral grooves 13 similar to the grooves 4 in plates 2—3 and the edges of the ring A of the upper plug being inwardly beveled to seat in these grooves. The lower plate 11 of the upper plug and the top plate 2 of the lower plug are adjustably connected by hinged telescoping guides consisting of the sleeve-members 14 fixed to the plate 11, and the hinged members 15 fixed to the plate 3, with the upper ends of the hinged members 15 sliding in the sleeve members 14 and held from withdrawal therefrom by pins 16 engaging the inturned flanges of the caps 17 on the ends of the sleeve sections 14.

18 is an externally threaded sleeve or pipe section fixed to the top side of the lower plate 11 and extending outward through the ring A and cone 12 and surrounding the shaft 10. The shaft 10 is free to slide inside the sleeve 18 just as the sections 15 are free to slide in the sleeves 14 to permit the upper and lower plugs to be adjusted toward and from each other to fit different sizes and sorts of pipe fittings. The cone 12 is free to move on the outside of the sleeve-member 18 except as its movements are controlled or limited by the winged nut or screw lever 19 which turns on the sleeve. The outer end of the sleeve is provided with any suitable sort of a handle as 20, and the end of the shaft 10 is provided with a suitable handle 21. The lower plug is expanded or contracted by turning the handle 21 to cause the plates 2—3 to approach or recede from each other. The upper plug is independently operated by the handle 19 to cause the cone to move toward or from its opposed plate 11.

In operation assuming a stack is to be tested in which there is the ordinary Y-fitting as shown at 22, Fig. 2. The device is inserted through the lateral branch of the Y until the lower plug comes into the vertical portion of the fitting below the junction of the lateral with the main body of the fitting. The upper plug remains in the lateral; the distance apart of the plugs is regulated by pushing in or pulling out on the handle 21 and shaft 10 to insure proper seating of the plugs in their respective passages. By turning the handle 21 in the proper direction, the lower plug is expanded to form a tight joint with the pipe, and by turning the handle or wing-nut 19 the upper plug is likewise expanded to form a tight joint. Thus it is seen that the vertical passage way of a stack and the lateral passage-way intersecting the stack may be quickly and securely plugged to enable the proper test to be made of all the pipe or stack sections above the point where the device is inserted. When the testing is completed the handle 21 with its shaft 10 is first turned to contract the lower plug and allow the sustained column of water in the stack to pass down and out of the outlet. Having removed the load on the lower plug the upper plug is then released and the device is easily and quickly withdrawn ready for another insertion at any desired point. In order to prevent the unbalancing of the upper plug when the water is released from the stack around the lower plug, I may provide a brace or support 24 fixed to a sleeve projection 25 which extends below the lower plate 11 of the upper plug; this brace being adapted to contact with the bottom of the lateral of the Y, and so prevent the upper plug from tipping over.

By means of the hinged rods 15 and the knuckle joint 9 the plugs can be turned at any angle to each other and the device operated equally as well as when the plugs are in the same axial line. This angular adjustment of the plugs adapts the apparatus to any sort of a commercial fitting, either straight, Y, bends, or the like.

The device can be made in any suitable size to adapt it to different kinds of work. As a rule the expansible bands A are of such size and character that each plug has a latitude of one inch more or less in expansion and contraction; that is to say the device having plugs four inches in diameter, would fit a pipe from 4 to 5 inches in diameter, &c. In case either plug should stick in the pipe it is an easy matter to unscrew the parts and take out the top plug.

It is possible that various changes may be made in the invention without departing from the principle thereof.

Having thus described my invention, what I claim and desire to secure by Letters Patent, is—

1. A testing device having in combination, two coöperating plug members, a rotatable shaft formed of jointed sections forming a unitary drive-connection between the members, and means located at one and the same end of the device and exterior to the part to be tested, for expanding each plug member independently of the other member.

2. A testing device comprising inner and outer plugs, each plug consisting of a flexible band held between opposed clamping members, and means including a jointed drive-shaft extending through the plates for operating each pair of clamping members independently of the other pair.

3. A testing device comprising two connected plugs, and means including a unitary jointed drive-shaft for expanding each plug independently of the other.

4. A testing device comprising two angularly adjustable expansible plugs, and means including a unitary jointed drive-shaft for expanding each plug independently of the other.

5. A testing device comprising two angularly adjustable independently expansible plugs, and means including a drive-shaft extending between the plug-members and having a universal joint in its length for adjusting the plugs toward and from each other.

6. A testing device comprising two expansible plugs and a single drive-shaft connecting the same, said shaft having a universal joint in its length, connections between the plug-members, said connection including sleeves carried by one of the members and rods carried by the other member and telescopically fitting said sleeves, and means associated with said drive-shaft for expanding the members.

7. A testing device consisting of two expansible plugs, a single drive-shaft connecting the same, said shaft having a universal joint in its length, connections between the plugs, said connections comprising sleeves and jointed rods slidably fitting the same, and means coöperating with the drive-shaft for expanding the plugs.

8. A testing device comprising two expansible plugs, each plug consisting of an elastic band, clamp members by which the bands are gripped, a flexible drive-shaft for operating two of said clamp-members to expand the interposed band, and means for expanding the other band, said last-named means including a sleeve carried by one of the clamping members of said other band, and a winged-nut acting on said sleeve and against the other member of said last-named band.

9. A duplex testing plug comprising a pair of lower-plates, an expansible band clamped between said plates, a third plate with which said lower-plates are connected, an expansible band seating on said third plate, and a cone coöperating with the third plate to compress the interposed band, a threaded sleeve member fixed to said third plate and on which said cone is slidable, means carried by the sleeve and acting against the cone to compress its band, and a drive-shaft extending through said sleeve and connected with one of said first-named lower-plates to compress said lower band, said drive-shaft being formed of independent sections having a universal joint between their meeting ends.

In testimony whereof I have hereunto set my hand in presence of two subscribing witnesses.

THOMAS DEASY.

Witnesses:
CORNELIUS V. BUTLER,
CHAS. E. TOWNSEND.